(12) United States Patent
Kinoe et al.

(10) Patent No.: US 8,822,596 B2
(45) Date of Patent: Sep. 2, 2014

(54) WATER-IN-OIL EMULSION ADHESIVE

(71) Applicant: Riso Kagaku Corporation, Tokyo (JP)

(72) Inventors: Kokoro Kinoe, Ibaraki-ken (JP);
Kazuhiro Higashi, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 92 days.

(21) Appl. No.: 13/681,931

(22) Filed: Nov. 20, 2012

(65) Prior Publication Data

US 2013/0158178 A1    Jun. 20, 2013

(30) Foreign Application Priority Data

Dec. 19, 2011   (JP) .................. 2011-277140

(51) Int. Cl.
*C08K 5/05* (2006.01)
*C08K 5/10* (2006.01)
*C08L 33/00* (2006.01)
*C08L 29/04* (2006.01)

(52) U.S. Cl.
USPC ........... 524/801; 524/315; 524/379; 524/803; 524/804; 523/502

(58) Field of Classification Search
USPC .................. 524/315, 379, 801, 803; 523/502
See application file for complete search history.

(56) References Cited

U.S. PATENT DOCUMENTS

| | | | | | |
|---|---|---|---|---|---|
| 3,625,807 | A | * | 12/1971 | Beemer | 428/494 |
| 4,043,959 | A | * | 8/1977 | Frye | 524/518 |
| 4,302,367 | A | * | 11/1981 | Cordes et al. | 524/25 |
| 4,629,758 | A | * | 12/1986 | Kawaguchi et al. | 524/495 |
| 5,977,242 | A | * | 11/1999 | Origuchi et al. | 524/521 |

FOREIGN PATENT DOCUMENTS

| | | |
|---|---|---|
| JP | 11-263955 | 9/1999 |
| JP | 2000-26825 | 1/2000 |
| JP | 2003-25759 | 1/2003 |
| JP | 2003-193011 | 7/2003 |

* cited by examiner

*Primary Examiner* — Tae H Yoon
(74) *Attorney, Agent, or Firm* — Hamre, Schumann, Mueller & Larson, P.C.

(57) ABSTRACT

A water-in-oil emulsion adhesive, which is composed of an oil phase and a water phase, wherein the water phase comprises a water-soluble polymer that functions as an adhesive component, the oil phase comprises a non-aqueous polar solvent having an SP value of 8 to 12 $(cal/cm^3)^{1/2}$, and the oil phase comprises a resin that is solid at 30° C. and has an acid value of 10 or less, in an amount of 5 to 15% by mass relative to a total mass of the adhesive.

6 Claims, No Drawings

WATER-IN-OIL EMULSION ADHESIVE

CROSS REFERENCE TO RELATED APPLICATIONS

This application is based upon and claims the benefit of priority from prior Japanese Patent Application No. 2011-277140 filed on Dec. 19, 2011; the entire contents of which are incorporated by reference herein.

BACKGROUND OF THE INVENTION

1. Field of the Invention

The present invention relates to a water-in-oil emulsion adhesive which can be used particularly favorably for papers.

2. Description of the Related Art

Booklet production and sealed document production are garnering much attention as methods for adding value to paper having images formed thereon. For example, in direct-mail advertising and the like, so-called self-mailers in which the paper is folded to form an envelope are now being used.

In order to enable a booklet or sealed document of an arbitrary size and shape to be prepared automatically in an in-line process, by using a post-processing device (finisher) such as a sealed document production device or booklet production device following completion of printing, issues that must be addressed include (1) the drying properties of the adhesive upon standing, (2) the storage stability, and (3) the ability to achieve adhesion in a short period of time.

In other words, booklet production and sealed document production may not necessarily be applications that are performed with high frequency, and therefore there is a possibility that the adhesive may be left to stand for a long period in an unsealed state inside a machine. Accordingly, if the adhesive dries or solidifies during standing in an open space, then unsatisfactory application of the adhesive occurs.

Further, if separation or degeneration or the like of the adhesive occurs during standing, then unsatisfactory application of the adhesive and poor adhesion and the like tend to occur.

Moreover, following application of the adhesive to the paper and subsequent bonding, the paper must be transported, and therefore the adhesive must dry quickly following application, and bond within a short time period.

Examples of known adhesives for paper include aqueous adhesives containing a water-soluble polymer such as starch, polyvinyl alcohol (PVA) or polyvinyl acetate dissolved in water. Among aqueous adhesives, PVA has a high level of safety, and exhibits favorable workability and adhesive performance, and is therefore widely used. Patent Documents 1 to 3 disclose aqueous adhesives that use PVA.

In order to shorten the adhesion time, the use of hot melt adhesives and active energy beam-curable adhesives and the like is also known, and in such cases, the adhesion time is shortened by the application of energy, either by heating or by irradiation with an active energy beam, following application of the adhesive. Patent Document 4 discloses a bookbinding device that uses a hot melt adhesive to perform bookbinding.

DOCUMENTS OF RELATED ART

Patent Document 1: JP 11-263955 A
Patent Document 2: JP 2003-193011 A
Patent Document 3: JP 2000-26825 A
Patent Document 4: JP 2003-25759 A

SUMMARY OF THE INVENTION

The inventors discovered that when left to stand inside machinery, all of these aqueous adhesives of the conventional technology dry and solidify due to evaporation of the water content, and are therefore unsuitable for use within in-line processes.

Further, in those cases where energy is required during adhesion, electricity consumption increases dramatically, meaning the process is undesirable from the perspective of environmental protection, and because a device must be provided for performing the heating or active energy beam irradiation, the apparatus also tends to increase in size.

Accordingly, an object of the present invention is to provide an adhesive that exhibits excellent storage stability, is resistant to solidification even when left standing for a certain time period inside a machine, and is capable of bonding rapidly and at low energy.

One aspect of the present invention relates to a water-in-oil emulsion adhesive, which is composed of an oil phase and a water phase, wherein the water phase comprises a water-soluble polymer that functions as an adhesive component, the oil phase comprises a non-aqueous polar solvent having an SP value of 8 to 12 $(cal/cm^3)^{1/2}$, and the oil phase comprises a resin that is solid at 30° C. and has an acid value of 10 or less, in an amount of 5 to 15% by mass relative to the total mass of the adhesive. Hereinafter "mass" is equal to and replaced by "weight".

DESCRIPTION OF THE EMBODIMENTS

Preferred embodiments of the water-in-oil (W/O) emulsion adhesive according to the present invention (hereafter also referred to as simply "the adhesive") are described below.

The emulsion adhesive of one aspect of the present invention exhibits excellent storage stability, and is resistant to solidification even when left standing in an open space for a certain time period. Moreover, the emulsion adhesive of the present invention generates adhesion rapidly and at low energy, enabling secure bonding of the adherend.

In the present invention, the adhesive is prepared in the form of a water-in-oil emulsion, and the adhesive component is included within the water phase. While not wishing to be bound to theory, the inventors believe that because the oil phase that surrounds the adhesive component is resistant to evaporation, the adhesive is unlikely to solidify even when left to stand in an open space. On the other hand, while not wishing to be bound to theory, the inventors believe that when the adhesive is applied to an adherend such as a paper, the oil phase penetrates into the interior of the adherend while the water phase is retained on the surface of the adherend, and as a result, the water phase particles coalesce and the water evaporates, meaning an adhesive film (cured film) can be formed rapidly.

In an additional feature of the present invention, because the oil phase comprises a specific resin and a specific solvent, the viscosity of the oil phase increases, thereby inhibiting cohesion of the water phase and enabling a W/O emulsion adhesive of good stability to be obtained. In the W/O emulsion adhesive, when, as described above, the water phase is retained on the surface of the adherend and the adhesive component within the water phase forms an adhesive film, if the oil phase comprises a resin, then when the solvent of the oil phase penetrates into the interior of the paper fibers via a capillary phenomenon, while not wishing to be bound to theory, it is thought that a portion of the resin that was dissolved in the solvent separates from the solvent and remains on the surface of the paper, forming a part of the adhesive film. In other words, because the resin contained within the solvent is a solid under typical usage conditions (30° C. or lower), while not wishing to be bound to theory, it is thought that once the resin separates from the solvent, it does not penetrate into the interior of the adherend together with the solvent, but is rather retained on the adherend surface together with the water phase, and as a result, is able to form a uniform adhesive film with no gaps in combination with the adhesive component.

In the present invention, because a uniform adhesive film can be formed, the adhesive strength improves, and in particular, an effect can be achieved wherein the adhesive strength is realized within a short time period. Accordingly, all manner of adhesive components such as starch and PVA can be used.

The water phase of the adhesive comprises a water-soluble polymer that functions as an adhesive component. An adhesive component is a component that exhibits adhesiveness, has a binding ability and a film-forming ability, and is capable of forming an adhesive film.

There are no particular limitations on the water-soluble polymer, provided it exhibits adhesiveness, and for example, conventional polymers that are used as the adhesive components of aqueous adhesives can be used. Being a water-soluble polymer, stability of the emulsion can be maintained, and good initial adhesion can be obtained following bonding to an adherend.

Specific examples of the water-soluble polymer include natural polymers such as starch and animal glues, and synthetic polymers such as polyvinyl alcohol and derivatives thereof, water-soluble cellulose and polyvinylpyrrolidone. A plurality of water-soluble polymers may also be used in combination. Commercially available polymers may be used, and for example in the case of starch, the various starch pastes manufactured by Yamato Co., Ltd. and Fuekinori Kogyo Co., Ltd. can be used.

There are no particular limitations on the amount added of the water-soluble polymer, but from the viewpoint of ensuring satisfactory strength for the adhesive film, the amount is preferably at least 3% by mass, and more preferably at least 8% by mass, of the total mass of the adhesive. On the other hand, in order to suppress film formation when the adhesive is left to stand in an open environment, and ensure good fluidity for the water phase so that the water phase coalesces readily on the surface of the adherend, the amount of the water-soluble polymer within the adhesive is preferably not more than 30% by mass, more preferably not more than 25% by mass, and most preferably 15% by mass or less.

Among the various possibilities, the water-soluble resin preferably includes a polyvinyl alcohol (PVA). The PVA may be a derivatized PVA that has undergone derivatization such as acetoacetylation, amination, cationization, anionization or silanol modification or the like.

When the PVA is in solution form, the viscosity and other properties of the solution vary depending on the polymerization degree and saponification degree of the PVA, and PVA having a low saponification degree and low polymerization degree generally suffers from inferior initial adhesion and water resistance of the cured film. However, in the present invention, PVA having all manner of values for the polymerization degree and the saponification degree can be used favorably. This is, the inventors believe, because the resin added to the oil phase remains on the surface of the adherend and contributes to the strength of the adhesive film, meaning that even when a PVA having a low polymerization degree and/or saponification degree is used, the adhesive film is still able to exhibit satisfactory levels of adhesive strength and water resistance.

Moreover, even many PVA polymers having a high saponification degree and/or high polymerization degree, which have been deemed unsuitable for use within conventional PVA aqueous adhesives due to difficulties associated with viscosity modification and the like, can be used favorably. This is because in the emulsion adhesive, even if the viscosity of the aqueous solution, namely the viscosity of the water phase, increases, this has minimal effect on the viscosity of the overall emulsion, meaning the PVA can be selected and used without having to consider the effect of the PVA on the viscosity of the aqueous solution.

Based on the same reason that modification of the viscosity of the water phase is unnecessary, the initial adhesion and water resistance can be enhanced by using a high concentration of PVA having a low saponification degree and a low polymerization degree.

In a preferred embodiment, from the viewpoints of ensuring good solubility within water, thereby enabling formation of a stable emulsion, and ensuring favorable disintegration of the emulsion upon application to an adherend, the use of a PVA having a saponification degree of 70 mol % or greater is preferred. Although a completely saponified PVA may be used, a partially saponified PVA having a saponification degree of 90 to 97 mol % is more desirable.

Although there are no particular limitations on the polymerization degree of the PVA, from the viewpoint of the strength of the adhesive film, the use of a PVA having a polymerization degree of at least 250 is preferred, and a PVA having a polymerization degree of 1,000 or greater is particularly preferred. Generally, if a PVA having a polymerization degree of 2,000 or greater is used, then the viscosity of the aqueous solution becomes very high and the workability deteriorates, and therefore such PVA polymers are rarely used in aqueous adhesives. However, in the type of emulsion adhesive described above, an increase in the viscosity of the water phase causes no particular problems, and even PVA polymers having very high polymerization degrees, such as PVA polymers having a polymerization degree of 3,000 or more, which are unsuitable for use within aqueous adhesives, can be used. As a result, the strength of the adhesive film can be increased, and satisfactory adhesive strength can be achieved even when the adhesive is applied thinly to the substrate. There are no particular limitations on the upper limit for the polymerization degree of the PVA, but in order to suppress solidification of the adhesive when left to stand for a certain time period in an open space, the polymerization degree is preferably not more than approximately 7,000, and is more preferably 6,000 or less.

The PVA may be synthesized in accordance with conventional production methods, or any of the various commercially available PVA products may be used. Examples of these commercially available PVA products include RS-1704 manufactured by Kuraray Co., Ltd., C-500, P-610, AL-06R and N-300 manufactured by The Nippon Synthetic Chemical Industry Co., Ltd., and VM-17 and VM-13KY manufactured by Japan VAM & POVAL Co., Ltd.

A plurality of PVA polymers having different saponification degrees and/or different polymerization degrees may also be used in combination.

For the same reasons as those described above in relation to the amount added of the water-soluble polymer, the PVA is preferably included in an amount that represents at least 3% by mass of the total mass of the adhesive, and this amount is also preferably not more than 30% by mass, and more preferably 20% by mass or less. In those cases where the saponification degree or the polymerization degree of the PVA is small, a larger amount of the PVA can be added, and therefore the actual amount added of the PVA is preferably set appropriately in accordance with the nature of the PVA being added.

Where necessary, the water phase may also include, besides the PVA, one or more conventional water-soluble additives such as wetting agents, electrolytes, antifungal agents, antioxidants, water evaporation inhibitors and pH modifiers.

Furthermore, a water-soluble solvent having a boiling point of 180° C. or higher is preferably added to the water phase to inhibit evaporation of the water fraction. This enables evaporation of the water fraction from the water phase to be suppressed, and can inhibit solidification when the adhesive is left to stand in an open environment.

Examples of this type of water-soluble solvent include glycerol, thiodiglycol, diethylene glycol, propylene glycol, ethylene glycol and triethylene glycol, and any one or more of these solvents may be used.

When the water-soluble solvent is added to the water phase, the SP value of the water-soluble solvent of the water phase preferably differs from the SP value of the non-aqueous polar solvent of the oil phase described below by at least 3 $(cal/cm^3)^{1/2}$. In those cases where the difference between the SP value of the water-soluble solvent and the SP value of the oil phase solvent is less than 3 $(cal/cm^3)^{1/2}$, the compatibility of the water-soluble solvent and the oil phase solvent increases, and there is a danger that the two solvents may mix, making preparation of an emulsion difficult. By ensuring that the difference between the SP values of the water-soluble solvent and the oil phase solvent is at least 3 $(cal/cm^3)^{1/2}$, a stable emulsion adhesive can be obtained.

Next is a description of the oil phase.

The oil phase comprises a resin that is solid at 30° C. and has an acid value of 10 or less (hereafter also referred to as "the solid resin"). The acid value represents the number of mg of potassium hydroxide required to neutralize the acidic component contained within 1 g of the sample (KOHmg/g). The acid value can be measured using the measurement method prescribed in JIS K2501.

A resin is preferably added to the oil phase for the purpose of emulsion stabilization (storage stability), but investigations by the present inventors revealed that if the resin that is added to the oil phase is a liquid, then the oil phase resin tends to penetrate into the interior of the adherend together with the solvent, resulting in the generation of non-uniform gaps with a size of several μm to several tens of μm in the water-soluble polymer film formed on the surface of the adherend. Further, it also became clear that use of a highly viscous liquid resin that does not penetrate into the interior of the adherend tends to impede the bonding of the water-soluble resin at the surface of the adherend.

In contrast, if the resin is a solid under typical usage conditions (30° C. or lower), then the resin does not penetrate into the interior of the adherend, but is rather retained on the adherend surface, and the existence of the solid resin appears to enable gaps between the water phase particles to be filled, meaning a uniform adhesive film with no gaps can be formed in combination with the water-soluble polymer, thus enabling an improvement in the adhesive strength.

Moreover, even with a solid resin, it was found that if the acid value is too high, then the affinity with the oil phase solvent increases, causing the resin to remain on the surface of the adherend while retaining the solvent, and as a result, the solid resin is swollen by the solvent, the adhesive film is softened and becomes prone to fracture, and the adhesive strength deteriorates. The water-soluble polymer forms a hard film on the surface of the adherend, but if the solid resin that fills the gaps within the hard film is too soft, then not only does the strength of the overall adhesive film deteriorate, but if the soft solid resin exists between the water-soluble polymer film and the adherend, then it may impede adhesion in some cases. Provided the acid value of the resin is low, separation of the solvent from the resin occurs rapidly, and the solvent penetrates into the interior of the adherend, meaning the types of problems described above do not occur. From the viewpoints of accelerating the separation of the solvent from the resin, and increasing the shear adhesive strength, the acid value of the resin is preferably 10 or less, more preferably 5 or less, and still more preferably 2 or less.

There are no particular limitations on the type of solid resin, provided it is solid at 30° C. and has an acid value of 10 or less, and examples of resins that can be used favorably include ketone resins, rosin ester resins, alkyd resins, amino resins, acrylic resins, maleic acid resins and petroleum resins. A plurality of resins of different acid values and/or types may also be used in combination.

Other resins besides the solid resin described above may also be added to the oil phase, provided they do not impair the intended effects of the present invention. Examples of resin that may be used in combination with the solid resin include styrene-acrylic resins, styrene-maleic acid resins, ethylene-vinyl acetate resins, coumarone-indene resins, terpene-phenol resins, phenolic resins, urethane resins, melamine resins, urea resins, epoxy resins, cellulose resins, vinyl chloride-vinyl acetate copolymers, xylene resins, aliphatic hydrocarbon resins, butyral resins and fumaric acid resins.

In order to ensure that the effects achieved by adding the solid resin manifest satisfactorily, the amount added of the solid resin is preferably at least 5% by mass relative to the total mass of the adhesive. However, as the amount added of the solid resin is increased, the adhesive becomes more likely to solidify when left standing in an open space for a certain time period. Accordingly, the upper limit for the amount of the solid resin is preferably not more than 15% by mass of the total mass of the adhesive.

The oil phase of the adhesive functions as the external phase of the water phase particles, and must perform the function of inhibiting evaporation of the water content from the water phase. Accordingly, the solvent for the oil phase is preferably a solvent which is resistant to evaporation when left to stand in an open environment, and which when applied to a paper, penetrates rapidly into the paper.

Moreover, the use of a solvent that is capable of dissolving the aforementioned solid resin is preferred. This is because by including the solid resin in the oil phase in the form of a solution dissolved in a solvent, the viscosity of the oil phase is increased, and as a result, coalescence of the water phase particles within the emulsion is suppressed, enabling the preparation of an emulsion adhesive having good stability, and separation of the solvent from the solid resin upon standing in an open space such as the inside of a printer is also less likely to occur, meaning the overall system can be stabilized.

Examples of this type of solvent are non-aqueous polar solvents having an SP value of 8 to 12 $(cal/cm^3)^{1/2}$.

The SP value is a value for evaluating the solubility of the solid resin in the solvent, and is calculated using Fedor's estimation method. Namely, the solubility parameter can be defined by the formula (1) shown below, using the sum of the cohesion energy densities for each of the functional groups of the substance $\Sigma E_{coh}$ and the sum of the molar volumes $\Sigma V$.

$$\delta(\text{SP value}) = (\Sigma E_{coh}/\Sigma V)^{1/2} \quad \text{formula (1)}$$

(See "Casebook of Applications of the Solubility Parameter—Mechanism and Examples of the Evaluation and Calculation of Solubility", pages 97 to 100, published by Johokiko Co., Ltd., Mar. 15, 2007)

The SP value of the solvent is more preferably within a range from 8 to 11 $(cal/cm^3)^{1/2}$, and still more preferably from 8 to 9 $(cal/cm^3)^{1/2}$.

A "non-aqueous polar solvent" is a solvent which, when mixed with water, exhibits a solubility within the water of 20 g/L or less. In a W/O emulsion, emulsification is achieved by adding the water phase components gradually to the oil phase containing the solvent. During this process, if the solvent is miscible with water, then the solvent dissolves in the water, making preparation of an emulsion problematic.

A polar solvent having an SP value that satisfies the above range (8 to 12 $(cal/cm^3)^{1/2}$) exhibits excellent dissolution of the solid resin, and by selecting a polar solvent that is also non-aqueous, the solvent within the oil phase can be prevented from dissolving in the water during addition of the water phase in the emulsification step, thus enabling the preparation of a W/O emulsion having good stability.

Examples of this type of non-aqueous polar solvent include linear and branched alcohols having approximately 5 to 30 carbon atoms, and ester-based solvents having approximately 6 to 30 carbon atoms, more preferably approximately 6 to 20 carbon atoms.

From the viewpoint of the solubility of the solid resin, an ester-based solvent is particularly desirable, and among ester-based solvents, saturated or unsaturated aliphatic carboxylate esters can be used most favorably. Further, from the viewpoint of the penetrability of the solvent upon application to the adherend, namely the solvent viscosity, the carboxylic acid is preferably a monocarboxylic acid or a dicarboxylic acid. The carboxylic acid preferably contains approximately 8 to 20 carbon atoms, and may be either linear or branched.

There are no particular limitations on the alcohol portion that forms the ester, but alkyl groups of 1 to 18 carbon atoms are preferred. This alkyl group may include branching, and may also contain a free hydroxyl group.

Although there are no particular limitations on the total number of carbon atoms within the carboxylate ester, a number from approximately 6 to 30 carbon atoms is preferred, approximately 12 to 30 carbon atoms or approximately 6 to 20 carbon atoms is more preferred, and approximately 15 to 20 carbon atoms is the most desirable.

Similarly, there are no particular limitations on the alcohol used as the non-aqueous polar solvent, provided it satisfies the above range for the SP value. The alcohol is not limited to monools, and polyols may also be used. The alcohol may also include an unsaturated group. The alcohol preferably contains approximately 5 to 30 carbon atoms, more preferably approximately 6 to 20 carbon atoms, and most preferably approximately 6 to 12 carbon atoms.

A plurality of these non-aqueous polar solvents may be used in combination. Accordingly, soybean oil or the like, which is a mixture of a plurality of fatty acids, can also be used favorably. Further, tall oil or the like, which contains resins and fatty acids as the main components, can also be used.

Although the following is not an exhaustive list, specific examples of favorable non-aqueous polar solvents include:

alcohols such as 1 pentanol (SP value: 10.96 $(cal/cm^3)^{1/2}$), 2-methyl-1-butanol (10.77 $(cal/cm^3)^{1/2}$), 3-methyl-1-butanol (10.77 $(cal/cm^3)^{1/2}$), 3-pentanol (10.77 $(cal/cm^3)^{1/2}$), n-hexanol (10.68 $(cal/cm^3)^{1/2}$), 4-methyl-2-pentanol (10.34 $(cal/cm^3)^{1/2}$), 2-ethylbutanol (10.51 $(cal/cm^3)^{1/2}$), 2-heptanol (10.31 $(cal/cm^3)^{1/2}$), 3-heptanol (10.14 $(cal/cm^3)^{1/2}$), n-octanol (10.28 $(cal/cm^3)^{1/2}$), 2-octanol (10.14 $(cal/cm^3)^{1/2}$), 2-ethylhexanol (10.14 $(cal/cm^3)^{1/2}$) 3,5,5-trimethylhexanol (9.74 $(cal/cm^3)^{1/2}$), n-dodecanol (9.81 $(cal/cm^3)^{1/2}$), and trimethylnonyl alcohol (10.77 $(cal/cm^3)^{1/2}$); and ester-based solvents such as isononyl isononanoate (SP value: 8.13 $(cal/cm^3)^{1/2}$), hexyl laurate (8.62 $(cal/cm^3)^{1/2}$), methyl laurate (8.64 $(cal/cm^3)^{1/2}$), isopropyl laurate (8.54 $(cal/cm^3)^{1/2}$), isopropyl myristate (8.54 $(cal/cm^3)^{1/2}$), isooctyl myristate (8.54 $(cal/cm^3)^{1/2}$), isopropyl palmitate (8.54 $(cal/cm^3)^{1/2}$), isostearyl palmitate (8.55 $(cal/cm^3)^{1/2}$), methyl oleate (8.63 $(cal/cm^3)^{1/2}$), ethyl oleate (8.63 $(cal/cm^3)^{1/2}$), isopropyl oleate (8.56 $(cal/cm^3)^{1/2}$), butyl oleate (8.62 $(cal/cm^3)^{1/2}$), methyl linoleate (8.64 $(cal/cm^3)^{1/2}$), isobutyl linoleate (8.79 $(cal/cm^3)^{1/2}$), ethyl linoleate (8.63 $(cal/cm^3)^{1/2}$), isopropyl isostearate (8.47 $(cal/cm^3)^{1/2}$), diisopropyl adipate (9.15 $(cal/cm^3)^{1/2}$), diisopropyl sebacate (9.03 $(cal/cm^3)^{1/2}$), diethyl sebacate (9.26 $(cal/cm^3)^{1/2}$), propylene glycol monocaprate (10.25 $(cal/cm^3)^{1/2}$), trimethylolpropane tri-2-ethylhexanoate (9.06 $(cal/cm^3)^{1/2}$), and glyceryl tri-2-ethylhexanoate (9.18 $(cal/cm^3)^{1/2}$). The numerical values in the parentheses indicate the SP value of the solvent.

Among the compounds listed above, the use of at least one compound selected from among those ester-based solvents having an SP value within a range from 8 to 9 $cal/cm^3)^{1/2}$ is particularly desirable. Ester-based solvents having an SP value within this range have a low viscosity, and penetration of the solvent by the capillary phenomenon upon application to paper proceeds smoothly, meaning an adhesive with a short set time can be obtained.

In addition, from the viewpoint of inhibiting drying of the adhesive, the use of a solvent having a boiling point of 100° C. to 350° C., and preferably 150° C. to 350° C., is desirable. The boiling point functions as an indicator of the ease with which the solvent evaporates, so that a lower boiling point indicates more ready evaporation, and a higher boiling point indicates better resistance to evaporation. The oil phase of the adhesive functions as the external phase of the water phase particles, and must perform the function of inhibiting evaporation of the water content from the water phase. Accordingly, by selecting a solvent having a boiling point of 100° C. or higher, more preferably 150° C. or higher as the oil phase solvent, evaporation of the oil phase can be suppressed, thereby inhibiting evaporation of the water from the water phase.

On the other hand, when applied to a paper, the oil phase solvent is preferably rapidly dispersed by penetration into the paper and evaporation. Provided the dispersion of the oil phase solvent is rapid when the adhesive is applied to a paper, disintegration of the emulsion can be accelerated, meaning the set time of the adhesive can be shortened. By selecting a solvent having a boiling point of 350° C. or lower as the oil phase solvent, evaporation of the solvent when left to stand in an open environment can be suppressed, whereas dispersion of the solvent upon application to a paper can still occur readily, thus enabling an adhesive having a short set time to be obtained.

The oil phase may also include other organic solvents besides the non-aqueous polar solvent described above, provided they do not impair the effects of the present invention. Examples of these other solvents that may be used in combination with the non-aqueous polar solvent include motor oil, spindle oil, machine oil, mineral oils such as liquid paraffin, vegetable oils such as olive oil, castor oil, and salad oils, and hydrocarbon solvents such as aromatic hydrocarbon solvents, aliphatic hydrocarbon solvents, mixed solvents containing an aromatic hydrocarbon and an aliphatic hydrocarbon, paraffin-based hydrocarbon solvents, isoparaffin-based hydrocarbon solvents, and naphthene-based hydrocarbon solvents.

These solvents may be used individually, or appropriate mixtures of two or more solvents may be used.

When one of these other solvents is used in combination with the non-aqueous polar solvent, the non-aqueous polar solvent preferably represents at least 60% by mass, and more preferably 80% by mass or more, of the total solvent mass that forms the oil phase. Further, the non-aqueous polar solvent preferably represents at least 6% by mass, and more preferably 9% by mass or more, of the total mass of the adhesive.

A solubilizer may be used in the oil phase to improve the dissolution of the solid resin. There are no particular limitations on the solubilizer, provided it is an additive that facilitates the dissolution of the solid resin in the solvent, and not limited examples of solubilizers that can be used favorably include alkylbenzenes, chlorinated paraffins, phthalate esters and higher fatty acids. These solubilizers may be used individually, or appropriate mixtures of two or more solubilizers may be used.

In order to generate the W/O emulsion, an emulsifier is preferably used in the oil phase. Although there are no particular limitations, nonionic surfactants can be used particularly favorably.

Examples of nonionic surfactants include hexaglyceryl hexaoleate, hexaglyceryl polyricinoleate, sorbitan higher fatty acid esters, polyoxyethylene sorbitan higher fatty acid esters, fatty acid monoglycerides, fatty acid diglycerides, higher alcohols, alkylphenols, fatty acids, ethylene oxide addition-type surfactants, including ether-based surfactants such as oleyl ethers having 2 to 30 mols of added polyoxyethylene (hereafter abbreviated as "POE (2 to 30)"), POE (2 to 35) stearyl ethers, POE (2 to 20) lauryl ethers, POE (1 to 20) alkylphenyl ethers, POE (6 to 18) behenyl ethers, POE (5 to 25) 2-decylpentadecyl ethers, POE (3 to 30) 2-decyltetradecyl ethers and POE (8 to 16) 2-octyldecyl ethers, ester-based surfactants such as POE (4 to 60) hydrogenated castor oils, POE (3 to 14) fatty acid monoesters, POE (6 to 30) fatty acid diesters and POE (5 to 20) sorbitan fatty acid esters, and ether ester-based surfactants such as POE (2 to 30) glyceryl monoisostearates, POE (10 to 60) glyceryl triisostearates, POE (7 to 50) hydrogenated castor oil monoisostearates and POE (12 to 60) hydrogenated castor oil triisostearates, and polyhydric alcohol-fatty acid ester-type surfactants including glyceryl fatty acid esters such as decaglyceryl tetraoleate, hexaglyceryl triisostearate, diglyceryl diisostearate and glyceryl monooleate, although this is not an exhaustive list.

The above nonionic surfactants may be used individually, or appropriate mixtures of two or more surfactants may be used.

Colorants such as pigments and dyes, pigment dispersants, and inorganic fillers and the like may also be added to the oil phase.

Other optional components besides those mentioned above may also be added, and these optional components can be added to the more appropriate phase of the water phase and the oil phase, depending on factors such as the solubility properties of the component.

For example, from the viewpoints of improving the stability of the emulsion and improving the adhesive strength, an extender pigment is preferably included in the oil phase. By including an extender pigment in the oil phase, the viscosity of the oil phase can be increased, and the stability of the emulsion can be improved. Further, in those cases where the adhesive is applied to a porous adherend such as paper, the extender pigment does not penetrate into the interior of the adherend, but is rather retained on the adherend surface. As a result, the extender pigment remains on the paper surface and fills voids at the paper surface, meaning the majority of the adhesive components can be retained at the surface of the adherend, enabling the paper adherends to be bonded together strongly.

Conventional materials may be used as the extender pigment. For example, inorganic microparticles such as white clay, talc, clay, diatomaceous earth, calcium carbonate, barium sulfate, titanium oxide, alumina white, silica, kaolin, mica and aluminum hydroxide can be used favorably, either individually or in appropriate combinations.

There are no particular limitations on the ratio between the water phase and the oil phase in the adhesive, and for example, the adhesive can be formed such that the oil phase component represents 10 to 70% by mass and the water phase component represents 90 to 30% by mass of the adhesive. From the viewpoint of stability of the emulsion, the amount of the water phase is preferably 85% by mass or less, and from the viewpoints of ensuring satisfactory hardness for the adhesive film and enhancing the adhesive strength, the amount of the water phase is more preferably at least 60% by mass.

The W/O emulsion adhesive can be produced by adding the water phase component gradually to the oil phase component and performing emulsification.

There are no particular limitations on the adherend or adhesion target material (substrate) to which the adhesive is applied, but an adherend into which the oil phase can penetrate readily following application of the adhesive is preferred, and therefore a permeable substrate such as a paper is preferable. There are no particular limitations on the type of paper, and a wide variety of papers can be used, including plain papers, high-quality papers, coated papers and art papers.

There are no particular limitations on the potential uses for the adhesive. The adhesive can be used favorably for the type of post-processing following printing described below, but may also be used prior to printing or for applications other than printed matter.

There are no particular limitations on the method used for applying the adhesive, and all manner of coating devices such as syringes, dispensers, nozzles, applicators, coaters and hand pumps can be used.

In order to prepare a booklet or a sealed document, a coating mechanism can be incorporated within a post-processing device (finisher), and the adhesive then applied in a pattern at the required location within the in-line process.

As described above, the adhesive according to the present invention rapidly develops adhesiveness or tack following application, even in a semi-dried state, and therefore exhibits excellent shear adhesive strength. Accordingly, even when used in combination with a device such as a finisher, the bonded location is unlikely to slip during transport of the paper following adhesion. The term "finisher" describes any machine that performs post-processing following printing, such as punch processing, stapling, paper folding or bookbinding.

EXAMPLES

The present invention is described below based on a series of Examples, but the present invention is in no way limited by these Examples.

Example 1

To a solution prepared by dissolving 2.5 g of Quintone DX390N (a petroleum resin, acid value: less than 0.1 (KO-Hmg/g), solid at 30° C., manufactured by Zeon Corporation) as the oil phase resin in 6.5 g of Salacos 99 (isononyl isononanoate, SP value: 8.13 $(cal/cm^3)^{1/2}$, boiling point: 284 to 286° C., manufactured by The Nisshin OilliO Group) as a solvent was added 1 g of Nikkol Hexaglyn PR-15 (polyglyceryl-6 polyricinoleate, manufactured by Nikko Chemicals Co., Ltd.) as an emulsifier, and the resulting mixture was stirred for 5 minutes to obtain an oil phase.

Using a PVA (P-610, manufactured by The Nippon Synthetic Chemical Industry Co., Ltd., saponification degree: 96 mol %, polymerization degree: 5,000) as the water-soluble polymer for addition to the water phase, 6 g of the PVA was dissolved in 34 g of water to prepare a PVA aqueous solution, and this aqueous solution was used as the water phase.

The thus obtained water phase was added in a continuous manner over a period of 20 minutes to the aforementioned oil phase, and emulsification was performed, yielding a W/O emulsion adhesive. During the addition of the water phase, the oil phase was stirred continuously using a batch-type desktop sand mill (manufactured by Kanpe Hapio Co., Ltd., using a high-viscosity stirring blade, rate of rotation: 2,100 rpm), and following completion of the water phase addition, the stirring was continued for a further 10 minutes.

Example 2

With the exceptions of changing the amount of the above resin (Quintone DX390N) to 4.5 g, and changing the amount of the above solvent (Salacos 99) to 4.5 g, a W/O emulsion adhesive was prepared using the same procedure as that described for Example 1.

Example 3

With the exceptions of changing the amount of the above resin (Quintone DX390N) to 6 g, and changing the amount of the above solvent (Salacos 99) to 3 g, a W/O emulsion adhesive was prepared using the same procedure as that described for Example 1.

Example 4

With the exception of using PVA403 (manufactured by Kuraray Co., Ltd., saponification degree: 80 mol %, polymerization degree: 300) as the PVA, a W/O emulsion adhesive was prepared using the same procedure as that described for Example 2.

Example 5

With the exception of using a starch paste (manufactured by Yamato Co., Ltd.) as the water-soluble polymer added to the water phase, in a proportion recorded in Table 1, a W/O emulsion adhesive was prepared using the same procedure as that described for Example 2.

Example 6

With the exception of using Quintone CX495 (a petroleum resin, acid value: 1.8 (KOHmg/g), solid at 30° C., manufactured by Zeon Corporation) as the resin added to the oil phase, a W/O emulsion adhesive was prepared using the same procedure as that described for Example 2.

Example 7

With the exception of using Neotall 101N (a rosin ester, acid value: 8.9 (KOHmg/g), solid at 30° C., manufactured by Harima Chemicals, Inc.) as the resin added to the oil phase, a W/O emulsion adhesive was prepared using the same procedure as that described for Example 2.

Example 8

With the exception of using 1-decanol (SP value: 10.01 $(cal/cm^3)^{1/2}$, boiling point: 230° C., manufactured by Wako Pure Chemical Industries, Ltd.) as the solvent added to the oil phase, a W/O emulsion adhesive was prepared using the same procedure as that described for Example 1.

Comparative Example 1

With the exception of using Hariphthal 816 (an alkyd resin, acid value: 7.9 (KOHmg/g), liquid at 30° C., manufactured by Harima Chemicals, Inc.) as the resin added to the oil phase, a W/O emulsion adhesive was prepared using the same procedure as that described for Example 2.

Comparative Example 2

With the exception of using Quintone D200 (a petroleum resin, acid value: 17 (KOHmg/g), solid at 30° C., manufactured by Zeon Corporation) as the resin added to the oil phase, a W/O emulsion adhesive was prepared using the same procedure as that described for Example 2.

Comparative Example 3

With the exception of preparing the oil phase by adding 1 g of the above emulsifier (Nikkol Hexaglyn PR-15) to 9 g of the above solvent (Salacos 99), and stirring the resulting mixture for 10 minutes, a W/O emulsion adhesive was prepared using the same procedure as that described for Example 1.

Comparative Example 4

With the exceptions of changing the amount of the above resin (Quintone DX390N) to 0.5 g, and changing the amount of the above solvent (Salacos 99) to 8.5 g, a W/O emulsion adhesive was prepared using the same procedure as that described for Example 1.

<Evaluation Methods>

The adhesives obtained in the Examples and Comparative Examples were tested for drying properties upon standing, standing storage stability, and adhesion (peel adhesive strength and shear adhesive strength using the methods described below. The results are shown in Table 1.

1. Drying Properties upon Standing

The adhesive was applied to a non-absorbent substrate formed from a metal sheet in an amount sufficient to form a circular shape having a thickness of 3 mm and a diameter of 3 mm, and the adhesive was then left to stand at normal temperature (30° C.). The adhesive was inspected visually after standing for 12 hours and then after standing for 20 hours to ascertain whether or not a film had formed on the surface of the adhesive.

A: no film had formed on the surface of the adhesive even after standing for 20 hours.

B: a film formed on the surface of the adhesive, or the entire adhesive cured completely, after standing for at least 12 hours but less than 20 hours.

D: a film had formed on the surface of the adhesive, or the entire adhesive had cured completely, after standing for 12 hours.

2. Standing Storage Stability Test

A 50 g sample of the adhesive was placed inside a sealed container, and the adhesive was inspected visually for the presence of free water 10 days (240 hours) after, and then 15 days (360 hours) after, the emulsification step.

A: no free water existed even after 360 hours had elapsed from the emulsification step.

B: free water was generated at a time at least 240 hours after, but less than 360 hours after, the emulsification step.

D: free water was generated at a time less than 240 hours after the emulsification step.

3. Peel Adhesive Strength

A paper substrate (Riso lightweight paper, 62 g/cm$^3$) was cut into a sheet having a width of 50 mm and a length of 100 mm, and the adhesive was applied across an area having a length of 80 mm from one end of the paper and a width of 50 mm, with a film thickness of 100 µm. Another sheet of the paper substrate of the same shape was then overlaid on top of the adhesive-coated sheet so that the entire areas of the two sheets overlapped, and the substrates were bonded together to form a test piece. The test piece was left to stand at normal temperature for 10 minutes or 30 minutes, and the adhesion was then evaluated by pulling the two sheets of paper in opposite directions from the end of the test piece to which the adhesive had not been applied, using a Tensilon universal tester RTC-1210A at a pull speed of 300 mm/minute and a pull angle of 180 degrees. In those cases where adherend failure occurred, with the paper substrate tearing during the peel test, the paper substrates were deemed to have "bonded". On the other hand, in those cases where either cohesive failure occurred, with the cured film of the adhesive rupturing without tearing the paper substrate, or interface failure occurred, with peeling occurring between the adhesive and the substrate, the paper substrates were deemed to have "not bonded".

A: the paper substrates had bonded after standing for 10 minutes.

B: the paper substrates had bonded after standing for 30 minutes.

D: even after standing for 30 minutes, the paper substrates had not bonded.

4. Shear Adhesive Strength

A paper substrate (Riso lightweight paper, 62 g/cm$^3$) was cut into a sheet having a width of 25 mm and a length of 100 mm, and the adhesive was applied across an area having a length of 10 mm from one end of the paper and a width of 25 mm, with a film thickness of 50 µm. Another sheet of the paper substrate of the same shape was then overlaid on top of the adhesive-coated sheet so as to cover the adhesive-coated portion, and the substrates were bonded together to form a test piece. This bonding was performed so that the end of the paper to which the adhesive had been applied (the adhesive-coated portion), and the end of the paper to which no adhesive had been applied overlapped in a parallel arrangement at the joint portion, with the sheets of paper bonded together at this overlapping joint in a lapped splice manner. The test piece was left to stand at normal temperature (30° C.) for one minute or 5 minutes, and the two ends of the test piece were then pulled apart using a Tensilon universal tester RTC-1210A at a pull speed of 50 mm/minute, and the test piece was observed for misalignment of the paper.

A: after one minute, the adhesive strength of the adhesive was strong, and no paper misalignment occurred.

B: after 5 minutes, the adhesive strength of the adhesive was strong, and no paper misalignment occurred.

D: even after 5 minutes, the adhesive strength of the adhesive was poor, and paper misalignment occurred.

TABLE 1

|  |  |  |  | Example | | | | | |
|---|---|---|---|---|---|---|---|---|---|
|  |  |  |  | 1 | 2 | 3 | 4 | 5 | 6 |
| Resin used (oil phase) |  | Product name |  | Quintone DX390N | Quintone DX390N | Quintone DX390N | Quintone DX390N | Quintone DX390N | Quintone CX495 |
|  |  | Acid value |  | <0.1 | <0.1 | <0.1 | <0.1 | <0.1 | 1.8 |
|  |  | Resin state |  | Solid | Solid | Solid | Solid | Solid | Solid |
| Formulation (% by mass) | Oil phase components | Solvent | Salacos 99 1-decanol | 13 | 9 | 6 | 9 | 9 | 9 |
|  |  | Resin |  | 5 | 9 | 12 | 9 | 9 | 9 |
|  |  | Emulsifier |  | 2 | 2 | 2 | 2 | 2 | 2 |
|  | Water phase components | Ion-exchanged water |  | 68 | 68 | 68 | 68 | 60 | 68 |
|  |  | PVA | P-610 | 12 | 12 | 12 |  |  | 12 |
|  |  |  | PVA403 |  |  |  | 12 |  |  |
|  |  | Starch |  |  |  |  |  | 20 |  |
|  | Total |  |  | 100 | 100 | 100 | 100 | 100 | 100 |
| Evaluation results | Drying properties upon standing |  |  | A | A | B | A | A | A |
|  | Standing storage stability |  |  | A | A | A | A | B | A |
|  | Peel adhesive strength |  |  | A | A | A | B | B | A |
|  | Shear adhesive strength |  |  | B | A | A | B | B | A |

|  |  |  |  | Example | | Comparative Example | | | |
|---|---|---|---|---|---|---|---|---|---|
|  |  |  |  | 7 | 8 | 1 | 2 | 3 | 4 |
| Resin used (oil phase) |  | Product name |  | Neotall 101N | Quintone DX390N | Hariphthal 816 | Quintone D200 | — | Quintone DX390N |
|  |  | Acid value |  | 8.9 | <0.1 | 7.9 | 17 | — | <0.1 |
|  |  | Resin state |  | Solid | Solid | Liquid | Solid | — | Solid |
| Formulation (% by mass) | Oil phase components | Solvent | Salacos 99 1-decanol | 9 |  | 9 | 9 | 18 | 17 |
|  |  |  |  |  | 13 |  |  |  |  |
|  |  | Resin |  | 9 | 5 | 9 | 9 | 0 | 1 |
|  |  | Emulsifier |  | 2 | 2 | 2 | 2 | 2 | 2 |
|  | Water phase components | Ion-exchanged water |  | 68 | 68 | 68 | 68 | 68 | 68 |
|  |  | PVA | P-610 | 12 | 12 | 12 | 12 | 12 | 12 |

TABLE 1-continued

|  |  |  |  |  |  |  |  |
|---|---|---|---|---|---|---|---|
|  |  | PVA403 |  |  |  |  |  |
|  |  | Starch |  |  |  |  |  |
|  | Total |  | 100 | 100 | 100 | 100 | 100 | 100 |
| Evaluation results | Drying properties upon standing | A | B | A | A | —*1 | —*1 |
|  | Standing storage stability | A | B | B | A | D | D |
|  | Peel adhesive strength | A | B | D | D | B | B |
|  | Shear adhesive strength | B | B | D | D | B | B |

*1 In Comparative Examples 3 and 4, the adhesive separated during evaluation of the drying properties upon standing, so measurement was impossible.

As is evident from Table 1, the adhesives of the Examples exhibited excellent results for all of the evaluations.

In contrast, in the Comparative Example 1 which used a liquid resin as an oil phase component, the Comparative Example 2 which used a resin having a high acid value, and the Comparative Example 3 which did not use a resin, some of the anticipated effects of the present invention were not obtained. Further, in the Comparative Example 4, in which the amount added of the solid resin was inadequate, it was found that the viscosity of the oil phase was low, and the oil phase and the water phase were prone to separation.

The results of further investigations concerning the amount added of the solid resin using Quintone DX390N revealed that when the amount added was 4% by mass, a similar tendency to that of Comparative Example 4 was observed, but it was confirmed that this problem did not occur once the amount added was increased to at least 5% by mass.

Moreover, when similar tests were performed using an aqueous adhesive containing a PVA or starch rather than an emulsion adhesive, the drying properties upon standing were poor, and a film had formed on the adhesive after standing for one hour.

What is claimed is:

1. A water-in-oil emulsion adhesive, which is composed of an oil phase and a water phase, wherein the water phase comprises a water-soluble polymer that functions as an adhesive component, the oil phase comprises a non-aqueous polar solvent having an SP value of 8 to 12 $(cal/cm^3)^{1/2}$, and the oil phase comprises a resin that is solid at 30° C. and has an acid value of 10 or less, in an amount of 5 to 15% by mass relative to a total mass of the adhesive.

2. The water-in-oil emulsion adhesive according to claim 1, wherein the non-aqueous polar solvent has an SP value of 8 to 9 $(cal/cm^3)^{1/2}$.

3. The water-in-oil emulsion adhesive according to claim 1, wherein the non-aqueous polar solvent comprises at least one solvent selected from the group consisting of aliphatic carboxylate esters containing 12 to 30 carbon atoms and alcohols containing 5 to 30 carbon atoms.

4. The water-in-oil emulsion adhesive according to claim 2, wherein the non-aqueous polar solvent comprises an ester-based solvent.

5. The water-in-oil emulsion adhesive according to claim 1, wherein the amount of the water-soluble polymer is 3 to 30% by mass of the total mass of the adhesive.

6. The water-in-oil emulsion adhesive according to claim 1, wherein the amount of the non-aqueous polar solvent is at least 6% by mass of the total mass of the adhesive.

* * * * *